United States Patent
Hoffmann

(10) Patent No.: US 7,841,629 B2
(45) Date of Patent: *Nov. 30, 2010

(54) PLUG-IN COUPLING FOR FLUIDIC SYSTEMS

(75) Inventor: Martin Hoffmann, Köln (DE)

(73) Assignee: Voss Automotive GmbH, Wipperfurth (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/037,555

(22) Filed: Feb. 26, 2008

(65) Prior Publication Data
US 2009/0108580 A1  Apr. 30, 2009

Related U.S. Application Data

(63) Continuation of application No. 10/414,262, filed on Apr. 15, 2003, now Pat. No. 7,338,094.

(30) Foreign Application Priority Data

Apr. 15, 2002  (DE) ............................. 202 05 833 U

(51) Int. Cl.
*F16L 27/00* (2006.01)
(52) U.S. Cl. .................. 285/321; 285/276; 285/277
(58) Field of Classification Search ................ 285/321, 285/276, 277, 83, 308, 314
See application file for complete search history.

(56) References Cited

U.S. PATENT DOCUMENTS

| 2,914,344 | A | * | 11/1959 | Anthes | 285/321 |
|---|---|---|---|---|---|
| 4,063,760 | A | * | 12/1977 | Moreiras | 285/321 |
| 4,278,276 | A | * | 7/1981 | Ekman | 285/321 |
| 4,804,206 | A | * | 2/1989 | Wood et al. | 285/321 |
| 7,014,215 | B2 | * | 3/2006 | Cooper et al. | 285/321 |
| 7,258,371 | B1 | * | 8/2007 | Hagen et al. | 285/321 |
| 7,338,094 | B2 | * | 3/2008 | Hoffmann | 285/321 |
| 7,364,207 | B2 | * | 4/2008 | McGee et al. | 285/321 |

FOREIGN PATENT DOCUMENTS

EP  0766033 A1  4/1997

* cited by examiner

*Primary Examiner*—David E Bochna
(74) *Attorney, Agent, or Firm*—Lackenbach Siegel LLP; Myron Greenspan

(57) ABSTRACT

A plug-in coupling for fluidic systems, in particular for $CO_2$- and fuel-conducting systems, including a housing (1) and a plug (2) which can be inserted into the housing (1). The plug (2) can be inserted by a plug stem (3) into a receiving opening (4) of the housing (1) in a manner sealed by at least one circumferential seal (5, 5a, 5b) and, when inserted, for it to be locked therein against release by a locking device having at least one latching element (7) arranged on the plug (2) and a latching shoulder (8) interacting with the latching element (7). The housing (1) has two-part design with an inner housing part (1a) and an outer housing part (1b), which can be connected releasably to the inner housing part (1a) so that it essentially surrounds the inner housing part (1a). In order to install it without destroying it, the latching shoulder (8) is formed at one end in an entry region (4a) of the receiving opening (4) on the outer housing part (1b).

24 Claims, 7 Drawing Sheets

Fig.1
Fig.2
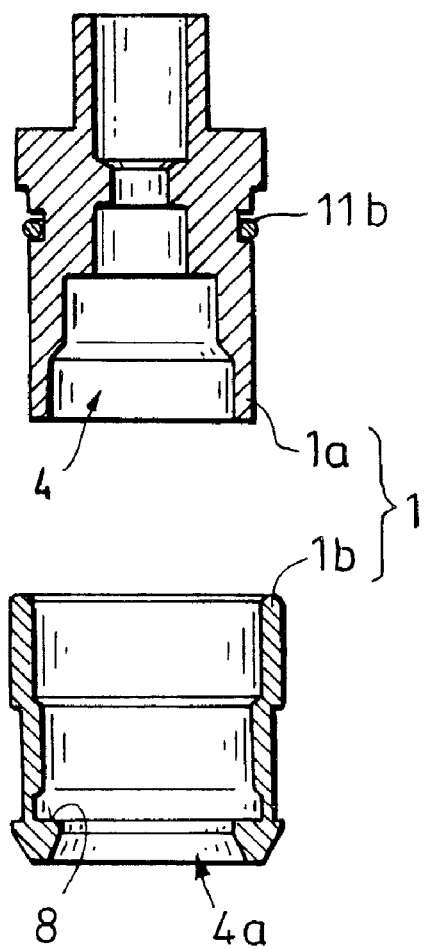
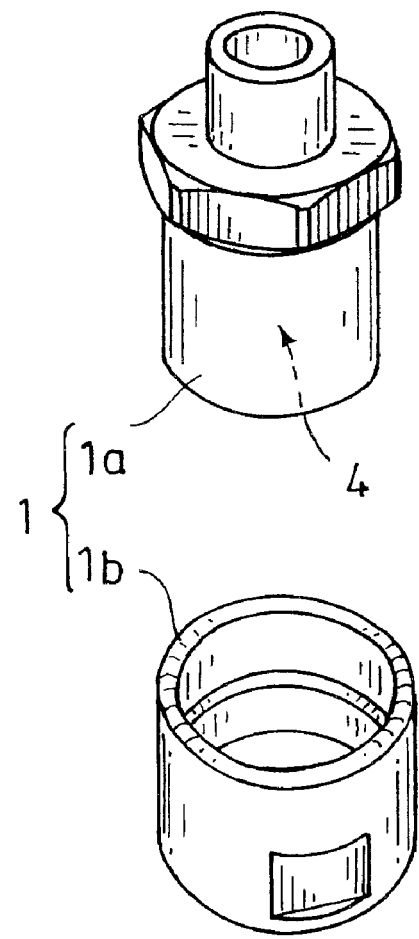
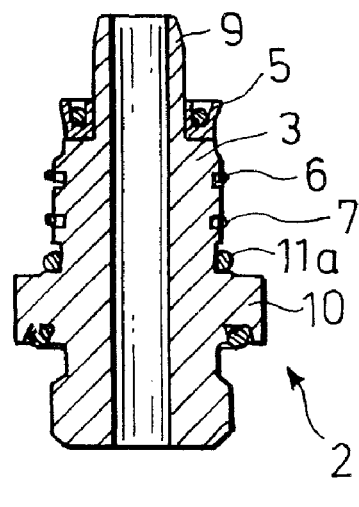
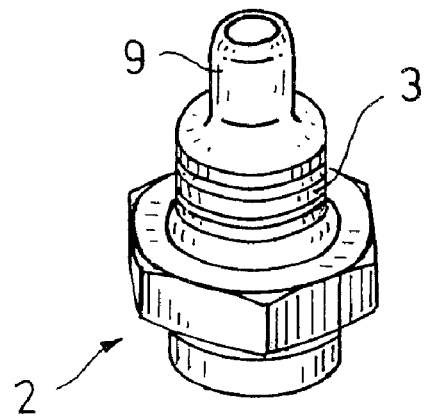

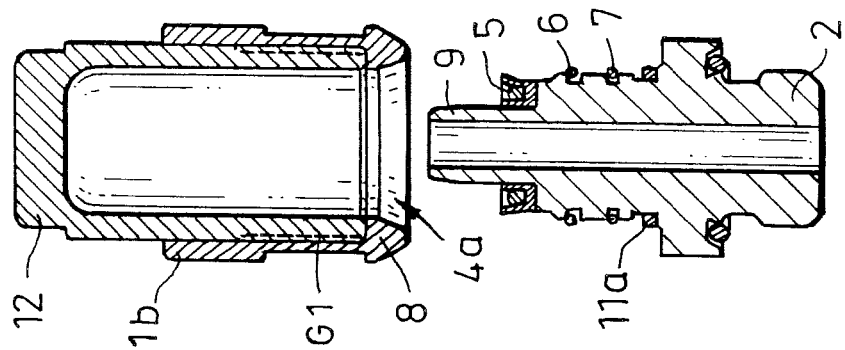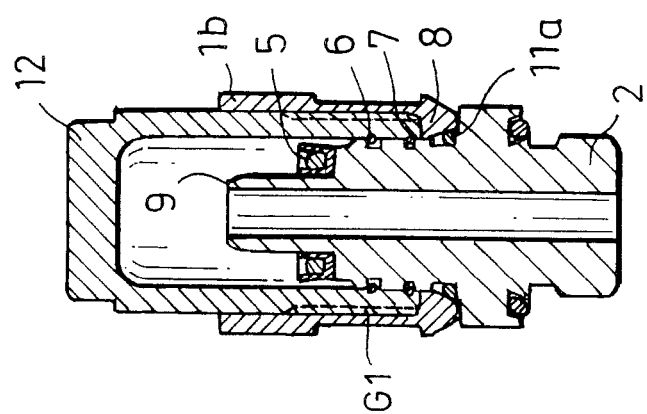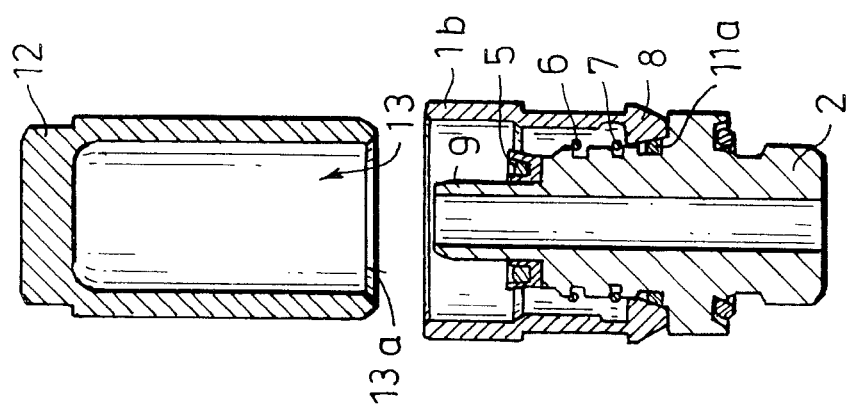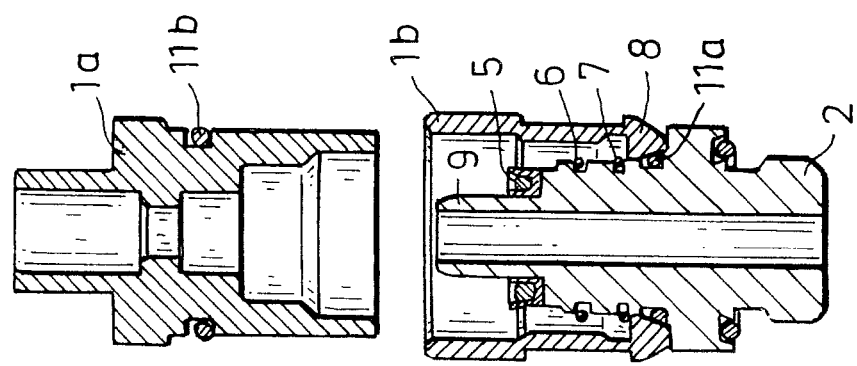

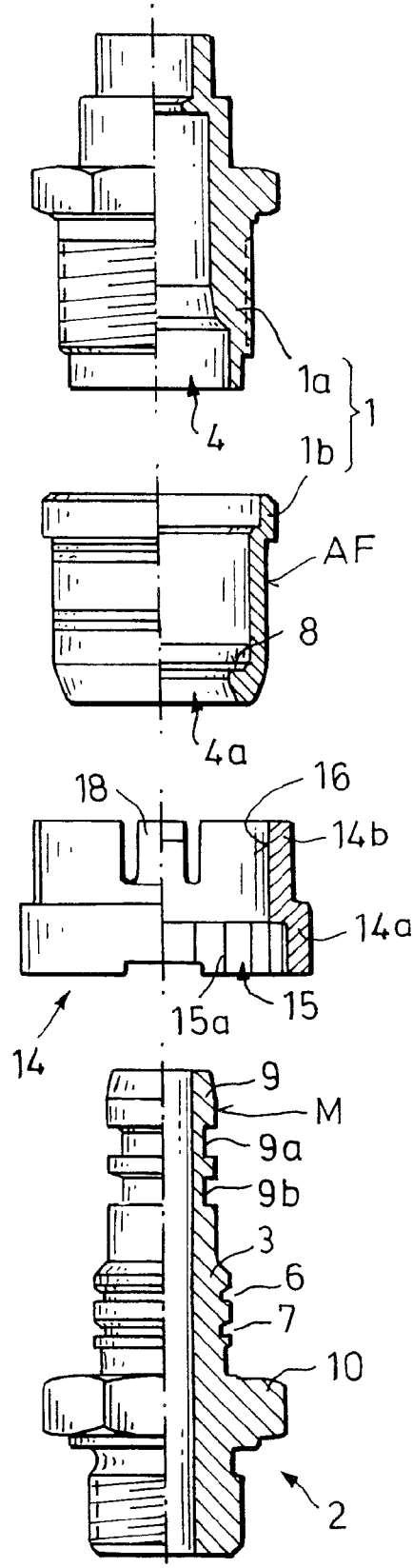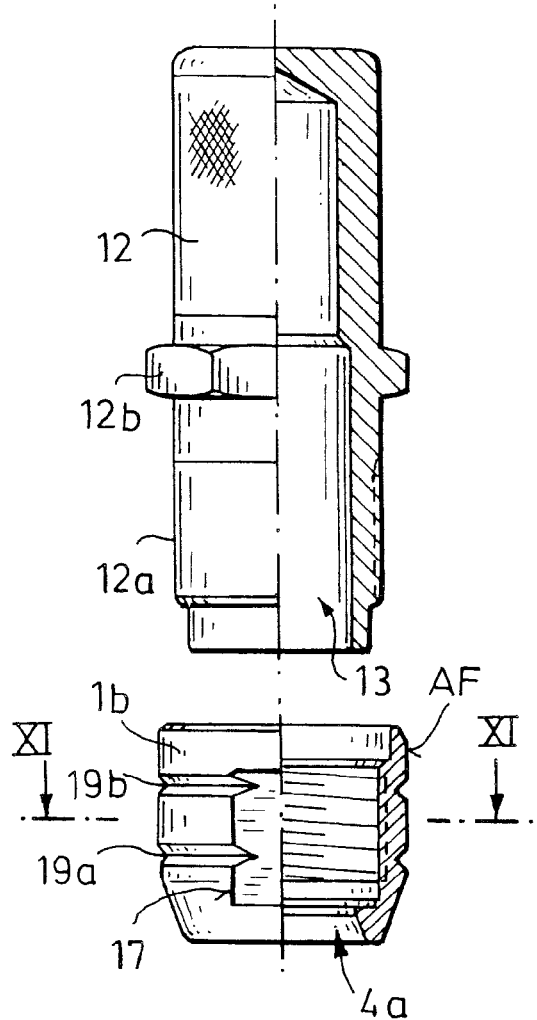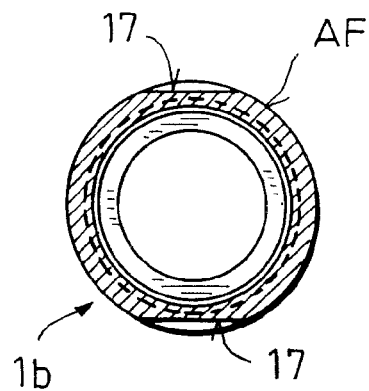
Fig.9
Fig.10
Fig.11

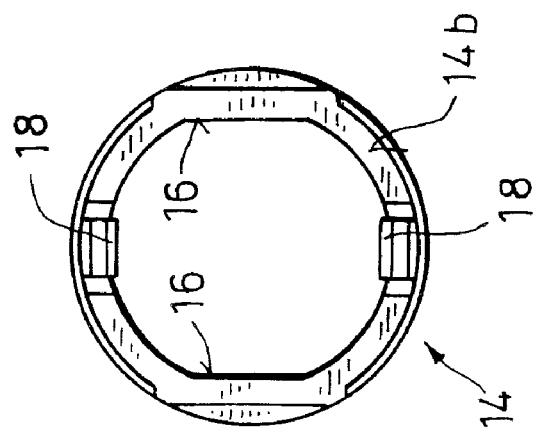
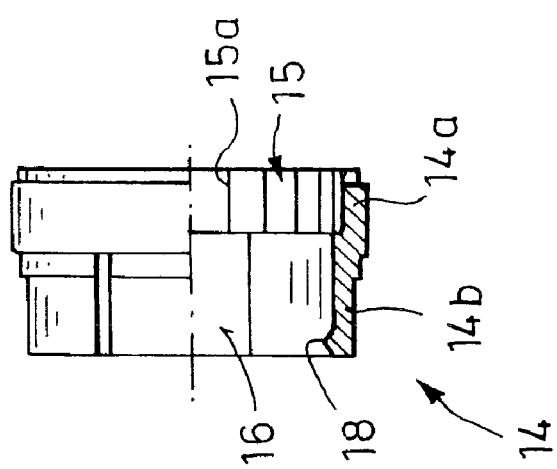
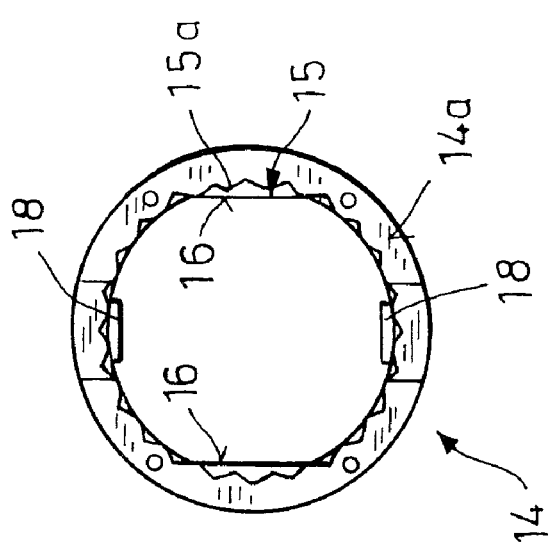

PLUG-IN COUPLING FOR FLUIDIC SYSTEMS

CROSS REFERENCE TO RELATED APPLICATION

This application is a continuation of U.S. patent application Ser. No. 10/414,262, filed on Apr. 15, 2003, to be issued as U.S. Pat. No. 7,338,094.

BACKGROUND OF THE INVENTION

1. Field of the Invention

The present invention relates to a plug-in coupling for fluidic systems, in particular for $CO_2$- and fuel-conducting systems, comprising a housing and a plug which can be inserted into the housing, it being possible for the plug to be inserted by means of a plug stem into a receiving opening of the housing in a manner sealed by at least one seal and, when inserted, for it to be locked therein against release by means of a locking device comprising at least one latching element arranged on the plug and a latching shoulder interacting with the latching element, and the housing being of two-part design by comprising an inner housing part and an outer housing part, which can be connected releasably to the inner housing part and essentially surrounds the inner housing part.

2. Description of the Prior Art

A plug-in coupling of this type is disclosed in EP 0 766 033 B1. In this document, a plug-in coupling for pneumatic pressure-medium systems, in particular, is described, said plug-in coupling comprising two coupling parts, specifically a housing part and a plug part, it being possible for the plug part to be inserted by means of a plug stem into a receiving opening of the housing part in a manner sealed via at least one circumferential seal, which sits in an annular groove in the one coupling part and interacts with a circumferential sealing surface of the other coupling part, and for it to be locked against being released by means of a locking device. The locking device here is designed in such a manner that a partially inserted prelatching position and a fully inserted full latching position are ensured, with, in the prelatching position, a seal being present which is incomplete in such a manner that, in the event of pressurization with a pressure medium, in particular compressed air, a perceptible leakage which is limited in a defined manner, in particular in the form of an acoustically perceptible leakage noise, occurs, and with, in the full latching position, a complete, pressure-tight seal being present by means of the circumferential seal bearing against the sealing surface. The locking device comprises two latching elements arranged axially one behind the other on the plug and a latching shoulder which interacts with the latching element and is situated in the coupling housing part, in the interior of the receiving opening for the plug part.

The disadvantage of a known plug-in coupling of this type is, if the housing is designed as a single part, firstly that the plug part, after being inserted into the coupling housing part and locked in place therein by the latching means, can only be separated again from the coupling part by destroying the plug-in coupling. EP 0 766 033 B1 therefore also provides a design in which the housing part comprises two releasably connected parts, a base part and an insert part, which is preferably designed as a retaining screw, in such a manner that, after release of the insert part from the base part, the plug part can be removed together with part of the locking device and the insert part. This technical solution is suitable in particular for devices in which the base part is part of a larger machine part, such as, for example, of a hydraulic or pneumatic connecting block.

SUMMARY OF THE INVENTION

The present invention is based on the object of providing an alternative, generic plug-in coupling which is suitable in particular for continuous hosepipes or pipelines which are to be connected to one another, in which removal without destroying it is possible.

According to the invention, this is achieved by the latching shoulder being formed at one end in the entry region of the receiving opening on the outer housing part.

After the plug has been inserted and completely latched to the housing, the plug-in coupling according to the invention can be released by undoing the connection between the outer and the inner housing part, in particular by unscrewing the outer housing part, which is designed as a union nut. In this case, the inner housing part and the plug can remain rotation-free, so that the plug can be designed, if required, in a positionally fixed manner as a screw-in part, for example, and the housing can be connected to a relatively rigid pipe or line which only permits small axial movements.

With the plug-in coupling according to the invention, it is furthermore advantageously also possible to separate the functions of "holding the plug" and "sealing", which are taken on at the same time by the inner housing part in the case of the known design, by it being possible to transfer the function of "holding the plug" to the outer housing part and only the function of "sealing" being carried out by the inner housing part. This in turn, for one thing, enables the bearing surfaces of the inner housing part for the circumferential seal to be designed in a highly precise manner with, at the same time, the overall plug-in coupling according to the invention having a very slim design. The plug-in coupling according to the invention is thus suitable, when a suitable seal is selected, for withstanding pressures of 200 bar and higher at temperatures of approximately 250° C.

Further advantageous refinement features of the invention are set forth below in the following description.

BRIEF DESCRIPTION OF THE DRAWINGS

The invention will be explained in greater detail below with reference to two preferred exemplary embodiments. In the drawings:

FIG. 1 shows, in an exploded illustration of its main parts, a first design of a plug-in coupling according to the invention in axial section, FIG. 2 shows, in an exploded illustration of its main parts, the first design of a plug-in coupling according to the invention in a perspective illustration, FIG. 5 to FIG. 8 show, again in an illustration corresponding to FIG. 1, various successive removal steps for the first design of a plug-in coupling according to the invention, FIG. 9 shows, in an exploded illustration of its main parts, a second design of a plug-in coupling according to the invention in an illustration which is half cut away over its axial length, FIG. 10 shows, in an illustration corresponding to FIG. 9, an outer housing part and a removal sleeve of the second design of a plug-in coupling according to the invention, FIG. 11 shows a cross section along the line XI-XI in FIG. 10, FIGS. 14a, 14b and 14c show, in three different views, the securing part provided in the second design of a plug-in coupling according to the invention.

DETAILED DESCRIPTION OF THE INVENTION

Figure 3:
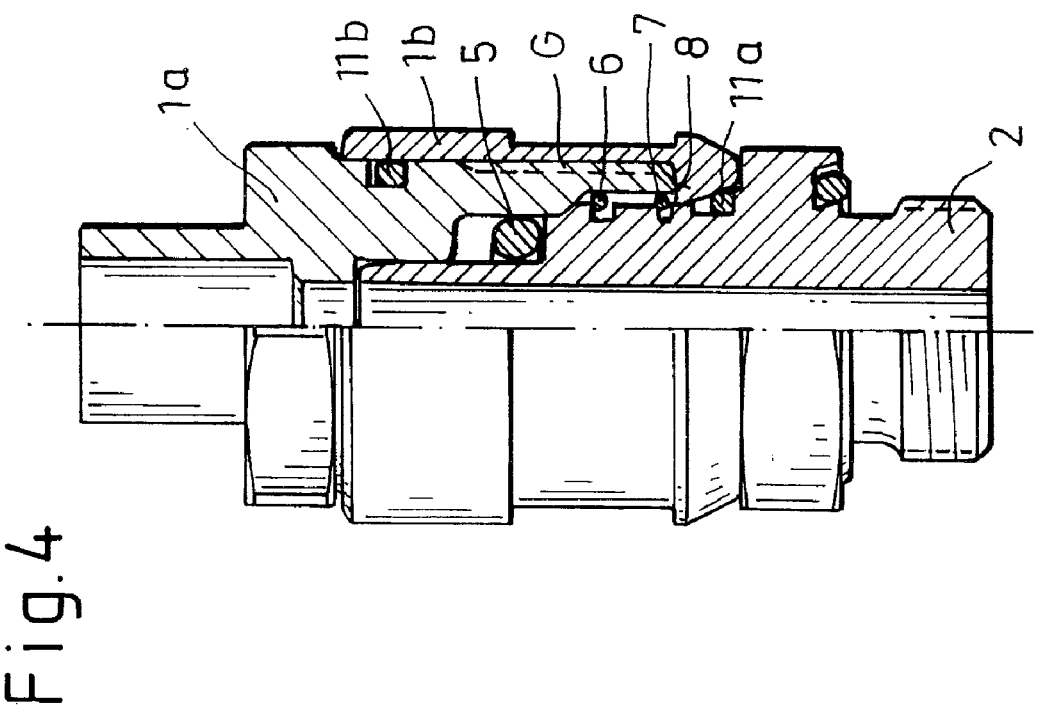
FIG. 3 shows, in an illustration corresponding to FIG. 1, a first installation step for the first design of a plug-in coupling according to the invention.

In the various figures of the drawing, parts which are identical are always provided with the same reference numbers and will therefore generally only be described once in each case below.

As emerges first of all from FIGS. 1 and 2, a plug-in coupling according to the invention for fluidic systems, in particular for $CO_2$- and fuel-conducting systems, comprises a housing 1 and a plug 2 which can be inserted into the housing 1, it being possible for the plug 2 to be inserted by means of a plug stem 3 into a receiving opening 4 of the housing 1 in a manner sealed by at least one circumferential seal 5. The plug 2 can be locked against release when inserted in the receiving opening 4 by means of a locking device (not described more specifically in its entirety).

The locking device here comprises at least one latching element—two latching elements 6, 7 arranged axially one behind the other on the plug 2 in the design illustrated, and a latching shoulder 8 interacting in each case with a latching element 6, 7. The latching elements 6, 7 are formed in each case by a snap ring held in a respective annular groove (not described more specifically) of the plug The housing 1 is of two-part design by comprising an inner housing part 1a, which forms the main part of the receiving opening 4, and an outer housing part 1b which can be connected releasably to the inner housing part 1a and essentially surrounds the inner housing part 1a. The latching shoulder 8 is formed at one end in the entry region 4a of the receiving opening 4 on the outer housing part 1b. As illustrated, the outer housing part 1b can preferably be designed as a union nut which can be screwed to the inner housing part 1a. (The corresponding internal and external threads are illustrated in the enlarged illustration of FIG. 4 and are referred to in summary by the reference symbol G.)

For better centering and introduction of the fluid seal 5, the plug 2 has, on the end side, an introductory stud 9 which is reduced in diameter in comparison with the rest of the body of the plug 2 and has a conically tapering tip. The circumferential seal 5 engages around the introductory stud 9 and, in the first design of the invention, is arranged at the base of the introductory stud 9 in the transition to the stem 3.

Figure 4:
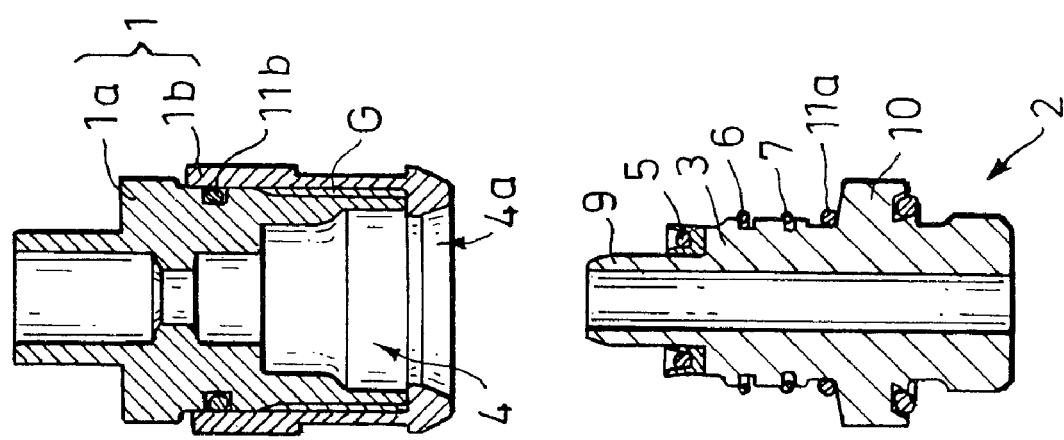
FIG. 4 shows, in an illustration half cut away over its axial length and on a scale enlarged in comparison with FIGS. 1 to 3, the first design of a plug-in coupling according to the invention in the installed or operating state.

In the simplest case where demands are relatively low, as shown in FIG. 4, the circumferential seal can be formed from an O-ring or, as illustrated in the other figures, can consist of a set of seals which is formed from a ring with two lips and a spring element embedded therein. In this case, at least part of the circumferential seal, in particular the ring with two lips, can consist of a polymeric fluorocarbon compound, such as PTFE (fluorocompound seal).

The plug 2 can preferably, as illustrated, have a collar 10 which is expanded in diameter with respect to the rest of the body of the plug 1, as a stop for the housing 1, in particular for the outer housing part 1b thereof, with it being possible for a dirt seal 11a, which is formed in particular from an O-ring, to be arranged on the plug 2 axially adjacent to the collar 10.

The plug 2 and both the inner housing part 1a and the outer housing part 1b can preferably consist of metallic materials, in particular of aluminum alloys or high-alloy special steel alloys. One material of this type is, for example, AlMgSi 1.

FIG. 3 shows, as already mentioned, a first installation step for the plug-in coupling according to the invention. This involves screwing the outer housing part 1b and the inner housing part 1a to each other. As can be gathered from the graphical illustration, the outer housing part 1b engages here over the end side of the inner housing part 1a in the entry region 4a of the receiving opening 4.

In order to produce the operating state illustrated by FIG. 4, the plug 2 is inserted into the housing 1 and latched there. It should be noted for this purpose that the latching can take place in a manner which is known per se such that the first latching element 6, in interaction with the latching shoulder 8, establishes a partially inserted prelatching position and, on further insertion of the plug 2, the second latching element 7, in interaction with the latching shoulder 8, establishes a fully inserted full latching position. In the prelatching position here, in particular with gases, a seal which is incomplete is present in such a manner that, in the event of the gas being pressurized, a perceptible leakage which is limited to a defined extent, in particular in the form of an acoustically perceptible leakage noise, occurs, while, in the full latching position, a complete, pressure-tight seal is present by means of the circumferential seal 5 bearing against the sealing surface of the inner housing part 1a. When the inserted state of the plug 2 is reached, the circumferential seal 5 then bears with its outer edge against the inside of the inner housing part 1a.

Since the outer housing part 1b tapers in the entry region 4a of the receiving opening 4, starting from an inside diameter which is larger than the outside diameter of the snap rings (latching elements 6, 7) in the expanded state, conically to an inside diameter which corresponds approximately to the outside diameter of the snap rings in the compressed state, the snap rings are compressed in the entry region 4a of the receiving opening 4 and then spring open again after they have passed the entry region 4a and position themselves behind the latching shoulder, with the result that the plug can no longer be pulled out of the housing 1.

When the plug 2 is inserted, the dirt seal 11a bears with its outer edge against the inside of the outer housing part 1b in the entry region 4a of the receiving opening 4. A (further) dirt seal 11b may also be provided at the other end of the outer housing part 1b, as illustrated in the form of an O-ring lying in an outer circumferential groove of the inner housing part.

The removal of the plug-in coupling according to the invention is illustrated in FIGS. 5 to 8. After the insertion and complete latching, the system can be released in a simple manner by unscrewing the union nut (outer housing part 1b), with it advantageously being possible, as already mentioned, for the inner housing part 1a and the plug part 2 to remain rotation-free. When the union nut is unscrewed, the inner housing part 1a is then merely pushed back axially by the insertion distance of the plug 2 (FIG. 5).

In order then to release the outer housing part 1b from the plug part 2, a removal sleeve 12 can be screwed instead of the inner housing part 1a into the outer housing part 1b (FIGS. 6 and 7). For this purpose, use can be made of a tubular removal sleeve 12 which, in the entry region 13a of an axial opening 13—starting from an inside diameter which is greater than the outside diameter of the snap rings (latching elements 6, 7) in the expanded state, tapers conically to an inside diameter which corresponds approximately to the outside diameter of the snap rings in the compressed state. The outside diameter of the removal sleeve 12 is smaller than the inside diameter of the outer housing part 1b. During the screwing-in process, the latching elements 6, 7 are unlocked by being pressed by the removal sleeve 12 radially inward away behind the latching shoulder 8, with the result that the outer housing part 1b can be pulled off axially together with the removal sleeve (FIG. 8). The threaded connection between the external thread of the removal sleeve 12 and the internal thread of the outer housing part 1b is denoted in FIGS. 7 and 8 by the reference symbol G1.

As already mentioned, FIGS. 9 to 13 and also 14a to 14c show a second design of the invention.

Figure 12:
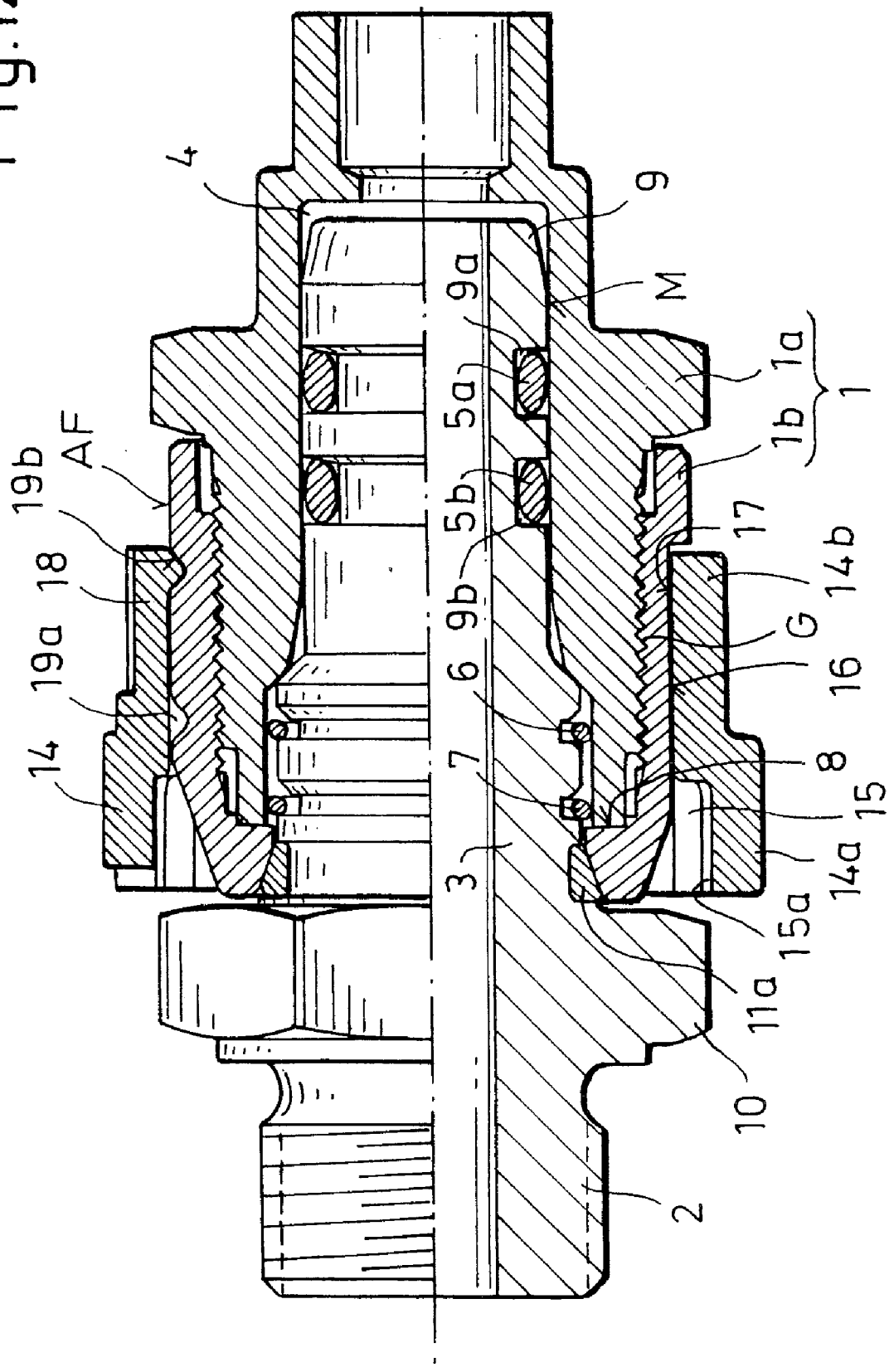
FIG. 12 shows, in an illustration partially cut away over its axial length and on a scale enlarged in comparison with FIGS. 9 to 11, the second design of a plug-in coupling according to the invention in the installed or operating state, with an inactive securing part, with the lower half of the drawing being rotated through 90° with respect to the upper half.
Figure 13:
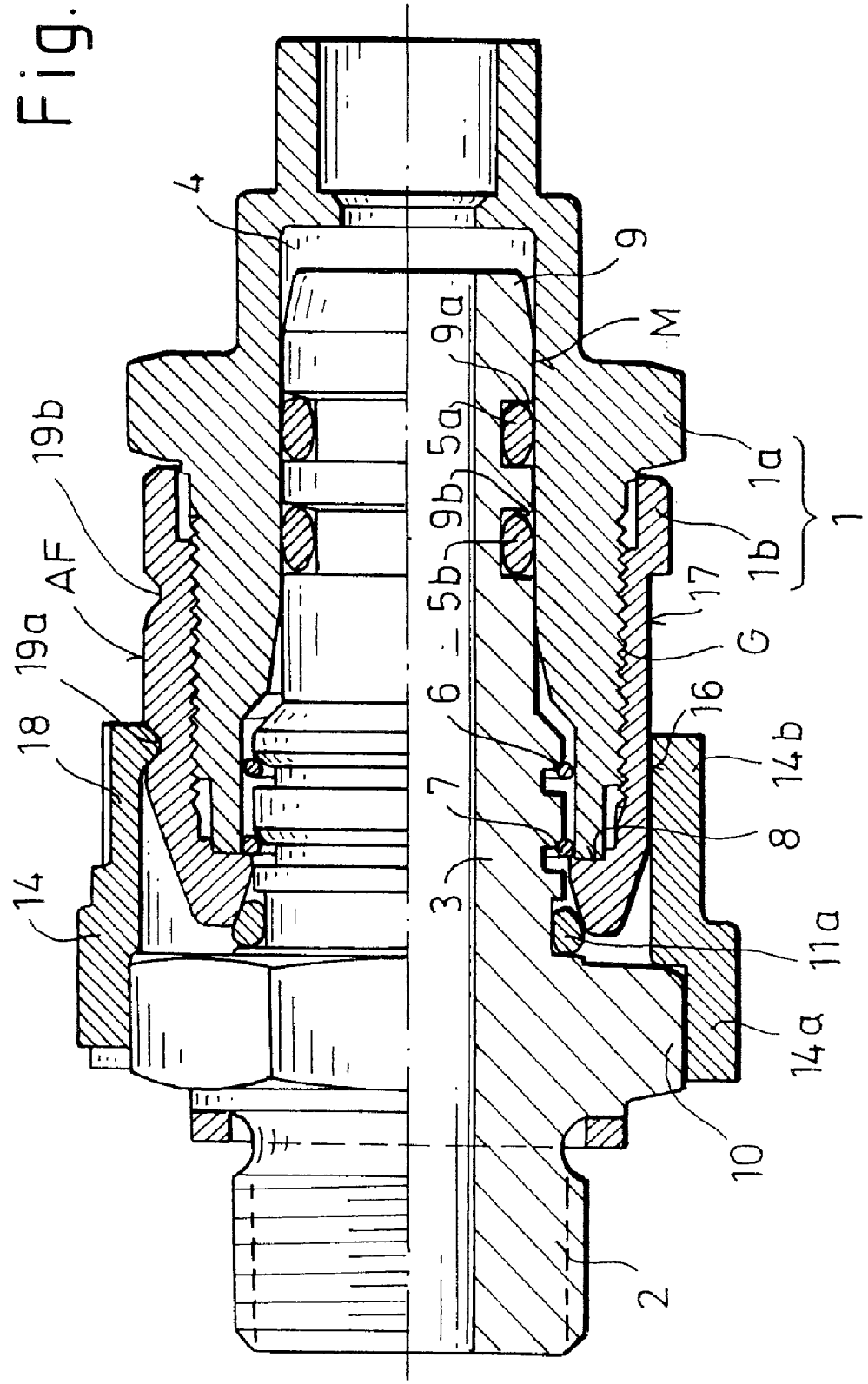
FIG. 13 shows, in an illustration partially cut away over its axial length and on a scale which is enlarged in comparison with FIGS. 9 to 11, the second design of a plug-in coupling according to the invention in the installed or operating state, with an active securing part which is in a locked state, with the lower half of the drawing being rotated through 90° with respect to the upper half.

As in particular the exploded drawing in FIG. 9 and the illustrations in the fitted state in FIGS. 12 and 13 show, the second design of the invention comprises a housing 1 which has an inner housing part 1a and an outer housing part 1b, as is the case in the first design of the invention. The basic construction is also otherwise the same as in the first design.

As an additional component in comparison with the first design, the second embodiment of the plug-in coupling according to the invention has an annular securing part 14 which preferably consists of plastic, is essentially hollow-cylindrical in the basic design, can be slid onto the outer housing part 1b and which, when locked in place (FIG. 13), prevents rotation of the plug 2 with respect to the housing 1.

The securing part 14, which is illustrated as an individual part in FIG. 9 and FIGS. 14a to 14c, has a first ring region 14a and a second ring region 14b, the first ring region 14a, when locked in place, being capable of being fixed in a manner secured against rotation on the plug 2, in particular on the collar 10 thereof. The second ring region 14b can be fixed in a manner secured against rotation and also free from displacement in the axial direction on the outer housing part 1b, in particular on the outer surface AF thereof.

For this purpose, the securing part 14 has an internal toothing 15 in the first ring region 14a for the purpose of fixing it on the plug 2, and the collar 10 of the plug 2 is designed as a polygon. In this manner, a form-fitting connection is brought about between the two parts in the locked state. In this case, it has proven favorable if the internal toothing 15 has 12 to 36 teeth 15a, in particular 24 teeth 15a.

Furthermore, the drawing shows that the securing part 14 has at least one wrench surface 16, preferably two wrench surfaces 16, in the second ring region 14b for the purpose of fixing it in a manner secured against rotation on the outer housing part 1b, said wrench surfaces being flattened with respect to the circular outer circumference of the part and, when the securing part 14 is locked in place (FIG. 13), being intended for the form-fitting bearing against a respectively corresponding wrench surface 17 on the outer surface AF of the outer housing part 1b. The sectional illustration in FIG. 11, in particular, shows very clearly the manner in which these wrench surfaces 17 of the outer housing part 1b are formed.

In addition, the securing part 14 has at least one latching lug 18, preferably two latching lugs 18, in particular of resilient design in the second ring region 14b for the purpose of fixing it in a manner free from displacement in the axial direction on the outer housing part 1b, it being possible for the latching lugs to be produced in each case—as FIG. 9 clarifies—by a longitudinal slot in the casing surface of the securing part 14. When the securing part 14 is locked in place, these latching lugs 18 are intended in each case for the formation of a form-fitting and frictional connection to a respectively corresponding groove 19a in the outer surface AF of the outer housing part 1b.

The latching lugs 18—in the same manner as the wrench surfaces 16—of the securing part 14 are in each case diametrically opposite one another while the latching lugs 19 are offset by approximately 90° with respect to the plane of the wrench surfaces 17. As illustrated in FIG. 12, the latching lugs 18, which are provided on the securing part 14 in the second ring region 14b for the purpose of fixing it in a manner free from displacement in the axial direction on the outer housing part 1b, can fix the securing part 14 not only in its active locking state, but also in an inactive, non-securing state of the securing part 14, in each case in a form-fitting and frictional manner on the outer housing part 1b. In this case, there is an interaction with a respectively corresponding groove 19b in the outer surface AF of the outer housing part 1b. This groove 19b runs in each case circumferentially parallel to the groove 19a, which is intended for the fixing in the locking state.

The installation and removal processes of the second design are—like the basic structural design—the same as in the first design of the plug-in coupling according to the invention, which is clarified in FIG. 10 by the fact that said plug-in coupling again has a removal sleeve 12 for the outer threaded part 1b, said removal sleeve having, in addition to its external thread (indicated by the reference symbol 12a), also a collar 12b which can be used as a means of applying force for a wrench. As far as the installation of the securing part 14 is concerned, the latter can, before the housing 1 is joined together with the plug 2, be pushed out of a position, as is illustrated in FIG. 9, onto the outer housing part 1b and first of all be connected in a latching manner, as FIG. 12 shows, to the outer housing part 1b in an inactive position. After the plug-in coupling is in the installed or operating state (FIG. 12), the secured state, the locking state of the securing part 14 according to FIG. 13 can then be produced by the latching connections of the latching lugs 18 with the grooves 19b being cancelled and the securing part 14 being displaced axially until its teeth 15a in the first ring region 14a engage in a form-fitting manner around the collar 10 of the plug 2 and until the latching lugs 18 latch into the grooves 19a provided for this.

In the second design of the plug-in coupling according to the invention, the manner of sealing the plug 2 also differs from that of the first design. Thus, in contrast to the first design, two circumferential seals 5a, 5b are provided on the plug 2. These circumferential seals 5a, 5b engage around the introductory stud 9 and are arranged in each case in a groove 9a, 9b situated in the casing M of the introductory stud 9. The grooves 9a, 9b run circumferentially and parallel to each other. The circumferential seals 5a, 5b situated therein can be produced from the same material in each case or else from different materials, with the effect of optimizing the sealing effect.

The invention is not restricted to the exemplary embodiments illustrated, but also includes all of the designs acting in the same manner within the context of the invention. It is thus possible, for example, to arrange just one latching element 7 on the plug part 2 if there is no need for a prelatching position. The principle which is described of a double latching means with two latching elements 6, 7 also has independent importance, i.e. it may, for example, also be realized independently of the described function of detecting leakages acoustically.

As far as the second design of the invention is concerned, it should be emphasized here that the securing part 14 is also effective and is of technical importance without the localization according to the invention of the latching shoulder 8 on the outer housing part 1b. The grooves 19b in the outer surface AF of the outer housing part 1b, which grooves are intended for interaction with the latching lugs 18 in the second ring region 14b of the securing part 14 in the inactive, non-securing state of the securing part 14, primarily have a holding function for the securing part 14. Moreover, they may advantageously also, however, carry out a signaling function by indicating, if they are visible, that the locking state is present. In order to assist this second function, the grooves 19b may have a marking, such as a color marking.

It is also particularly advantageous in the second design of the invention if a release torque of the outer housing part 1b, which is screwed to the inner housing part 1a, is greater than a torque which, if it acts on the securing part 14, causes the securing part 14 to break. This coordination can be achieved by an appropriate selection of the material for the securing part 14. A design of this type has the effect that incorrect release of the connection between the plug 2 and housing 1 always leads to the securing part 14 being destroyed, with the damage which is produced then pointing to the risk of a possible leakage and to the preceding, incorrect engagement or to a corresponding, different damaging effect leading to the breakage.

Furthermore, the invention so far is also not restricted to the combination of features defined above, but may also be defined by any other desired combination of certain features of all of the individual features disclosed in their entirety. This means that, in principle, virtually any individual feature may be omitted or be replaced by at least one individual feature disclosed elsewhere in the application. In this respect, the disclosure is to be understood merely as a first attempt at defining an invention.

REFERENCE SYMBOLS

1 Housing
1a Inner housing part
1b Outer housing part
2 Plug
3 Plug stem of 2
4 Receiving opening of 1
4a Entry region of 4
5, 5a, 5b Circumferential seals
6, 7 Latching elements (snap rings)
8 Latching shoulder of 1b
9 Introductory stud of 2
9a, 9b Grooves in M
10 Collar of 2
11a, 11b Dirt seals (O-rings)
12 Removal sleeve
12a External thread of 12
12b Collar of 12
13 Opening in 12
13a Entry region of 13
14 Securing part
14a First ring region of 14
14b Second ring region of 14
15 Internal toothing of 14a
15a Tooth of 15
16 Wrench surface of 14
17 Wrench surface of 1b
18 Latching lug of 14
19a, 19b Grooves in 1b for 18
AF Outer surface of 1b
G Thread
M Casing of 9

The invention claimed is:

1. A plug-in coupling for fluidic systems, comprising:
a housing (1) and a plug (2) having an annular groove, the plug (2) being insertable into the housing (1) by inserting a plug stem (3) of the plug (2) into a receiving opening (4) of the housing (1) so that at least one circumferential seal (5, 5a, 5b) provides a seal therebetween, the plug (2) having a collar (10) expanded in diameter with respect to a remaining body portion of the plug (2) and providing a stop for the outer housing part (1b) of the housing (1);
a locking device locking the plug (2) in the housing (1) against relative displacement thereto, the locking device including two latching elements (6,7) in the form of snap rings spaced from each other along said plug (2) and held in associated annular grooves of the plug (2) and a latching shoulder (8) arranged on the housing (1) and interacting with at least one of said latching elements (6,7),
said housing (1) having a two-part construction to provide an inner housing part (1a) and an outer housing part (1b), the outer housing part (1b) being releasably connected to the inner housing part (1a) so that the outer housing part (1b) essentially surrounds the inner housing part (1a), wherein the latching shoulder (8) is provided in an entry region (4a) of the receiving opening (4) at one end of the outer housing part (1b).

2. The plug-in coupling as claimed in claim 1, wherein the outer housing part (1b) is constructed as a union nut which can be screwed to the inner housing part (1a).

3. The plug-in coupling as claimed in claim 1, wherein the outer housing part (1b) engages over an end of the inner housing part (1a) at the entry region (4a) of the receiving opening (4).

4. The plug-in coupling as claimed in claim 1, wherein said plug stem (3) of the plug (2) includes at least two circumferential seals.

5. The plug-in coupling as claimed in claim 1, wherein the plug (2) has, on an end thereof an introductory stud (9), the introductory stud (9) being reduced in diameter in comparison with remaining body portion of the plug (2).

6. The plug-in coupling as claimed in claim 5, wherein the at least one circumferential seal (5) surrounds and engages said introductory stud (9) and is arranged at a base of the introductory stud (9).

7. The plug-in coupling as claimed in claim 5, wherein the at least one circumferential seal (5a, 5b), engages around the introductory stud (9) and is each arranged in a groove (9a, 9b) provided in a casing (M) of the introductory stud (9).

8. The plug-in coupling as claimed in claim 1, wherein, when the plug (2) is inserted, said at least one circumferential seal (5, 5a, 5b) each bears with its outer edge against an inside surface of the inner housing part (1a).

9. The plug-in coupling as claimed in claim 1, wherein the outer housing part (1b) has a taper in the entry region (4a) of the receiving opening (4), the taper starting from a first inside diameter, which is larger than an outside diameter of the snap ring in an expanded state, and extending conically inwardly to a second inside diameter corresponding approximately to the outside diameter of the snap ring in a compressed state.

10. A plug-in coupling for fluidic systems, comprising:
a housing (1) and a plug (2) having an annular groove, the plug (2) being insertable into the housing (1) by inserting a plug stem (3) of the plug (2) into a receiving opening (4) of the housing (1) so that at least one circumferential seal (5, 5a, 5b) provides a seal therebetween, the plug (2) having a collar (10)-expanded in diameter with respect to a remaining body portion of the plug (2) and providing a stop for the outer housing part (1b) of the housing (1);
a locking device locking the plug (2) in the housing (1) against relative displacement thereto, the locking device including two latching elements (6,7) in the form of snap rings spaced from each other along said plug (2) and held in associated annular grooves of the plug (2) and a latching shoulder (8) arranged on the housing (1) and interacting with at least one of said latching elements (6,7),
said housing (1) having a two-part construction to provide an inner housing part (1a) and an outer housing part (1b), the outer housing part (1b) being releasably connected to the inner housing part (1a) so that the outer housing part (1b) essentially surrounds the inner housing part (1a), the outer housing part (1b) is designed as a union nut, which can be screwed to the inner housing part (1a) wherein the latching shoulder (8) is provided in an entry region (4a) of the receiving opening (4) at one end of the outer housing part (1b),
said second latching element (6) being arranged on the plug (2) so that the second latching element (6) interacts with the latching shoulder (8) to establish a partially inserted prelatching position, and, on further insertion of the plug (2), the other latching element (7) on the plug (2) then interacts with the latching shoulder (8) to establish a completely inserted full latching position, with, in the prelatching position, an incomplete seal being provided so that when a fluid or a gas pressurized, a limited perceptible leakage occurs in a defined manner as an acoustically perceptible leakage noise, and with, in the full latching position, a complete pressure-tight seal is provided by the at least one circumferential seal (5) bearing against a sealing surface of the inner housing part (1a).

11. A plug-in coupling for fluidic systems, comprising:
a housing (1) and a plug (2) having an annular groove, the plug (2) being insertable into the housing (1) by inserting a plug stem (3) of the plug (2) into a receiving opening (4) of the housing (1) so that at least one circumferential seal (5, 5a, 5b) provides a seal therebetween, the plug (2) having a collar (10)-expanded in diameter with respect to a remaining body portion of the plug (2) and providing a stop for the outer housing part (1b) of the housing (1);
a locking device locking the plug (2) in the housing (1) against relative displacement thereto, the locking device including at least one latching element (6,7) comprising a snap ring held in a respective annular groove of the plug (2) and a latching shoulder (8) arranged on the housing (1) and interacting with the latching element (7),
said housing (1) having a two-part construction to provide an inner housing part (1a) and an outer housing part (1b), the outer housing part (1b) being releasably connected to the inner housing part (1a) so that the outer housing part (1b) essentially surrounds the inner housing part (1a), the outer housing part (1b) is designed as a union nut, which can be screwed to the inner housing part (1a) wherein the latching shoulder (8) is provided in an entry region (4a) of the receiving opening (4) at one end of the outer housing part (1b); and
a removal sleeve (12) which can be screwed into the outer housing part (1b), the removal sleeve (12) including an entry region (13a) of an axial opening (13), starting from a first inside diameter, which is larger than an outside diameter of the snap ring in an expanded state, and then tapering conically inwardly to a second inside diameter which corresponds approximately to the outside diameter of the snap ring in a compressed state.

12. A plug-in coupling for fluidic systems, comprising:
a housing (1) and a plug (2), the plug (2) having an annular groove, the plug (2) being insertable into the housing (1) by inserting a plug stem (3) of the plug (2) into a receiving opening (4) of the housing (1) so that at least one circumferential seal (5, 5a, 5b) provides a seal therebetween;
a locking device locking the plug (2) in the housing (1) so as to be locked therein against release, the locking device including two latching elements (6,7) in the form of snap rings spaced from each other along said plug (2) and held in associated annular grooves of the plug (2) and a latching shoulder (8) arranged on the housing (1) and interacting with at least one of said latching elements (6,7),
said housing (1) having a two-part construction to provide an inner housing part (1a) and an outer housing part (1b), the outer housing part (1b) being releasably connected to the inner housing part (1a) so that the outer housing part (1b) essentially surrounds the inner housing part (1a); and
a dirt seal (11b) arranged between the inner housing part (1a) and the outer housing part (1b), the outer housing part (1b) is designed as a union nut, which can be screwed to the inner housing part (1a) wherein the latching shoulder (8) is provided in an entry region (4a) of the receiving opening (4) at one end of the outer housing part (1b).

13. The plug-in coupling as claimed in claim 12, wherein, when the plug (2) is inserted, the dirt seal (11a) bears with its outer edge against an inside surface of the outer housing part (1b) in the entry region (4a) of the receiving opening (4).

14. The plug-in coupling as claimed in claim 12, wherein the outer housing part (1b) engages over an end of the inner housing part (1a) at the entry region (4a) of the receiving opening (4).

15. The plug-in coupling as claimed in claim 12, wherein the plug stem (3) of the plug (2) includes at least two circumferential seals.

16. The plug-in coupling as claimed in claim 12, wherein the plug (2) has, on an end thereof an introductory stud (9), the introductory stud (9) being reduced in diameter in comparison with remaining body portion of the plug (2).

17. The plug-in coupling as claimed in claim 16, wherein the at least one circumferential seal (5) surrounds and engages said introductory stud (9) and is arranged at a base of the introductory stud (9).

18. The plug-in coupling as claimed in claim 16, wherein the at least one circumferential seal (5a, 5b), engages around the introductory stud (9) and is each arranged in a groove (9a, 9b) provided in a casing (M) of the introductory stud (9).

19. The plug-in coupling as claimed in claim 12, wherein, when the plug (2) is inserted, the at least one circumferential seal (5, 5a, 5b) each bears with its outer edge against an inside surface of the inner housing part (1a).

20. The plug-in coupling as claimed in claim 12, wherein the outer housing part (1b) has a taper in the entry region (4a) of the receiving opening (4), the taper starting from a first inside diameter, which is larger than an outside diameter of the snap ring in an expanded state, and extending conically inwardly to a second inside diameter corresponding approximately to the outside diameter of the snap ring in a compressed state.

21. A plug-in coupling for fluidic systems, comprising:
a housing (1) and a plug (2), the plug (2) having an annular groove, the plug (2) being insertable into the housing (1) by inserting a plug stem (3) of the plug (2) into a receiving opening (4) of the housing (1) so that at least one circumferential seal (5, 5a, 5b) provides a seal therebetween;
a locking device locking the plug (2) in the housing (1) so as to be locked therein against release, the locking device including at least one latching element (7) in the form of a snap ring held in said annular groove of the plug (2) and a latching shoulder (8) arranged on the housing (1) and interacting with the latching element (7);
said housing (1) having a two-part construction to provide an inner housing part (1a) and an outer housing part (1b), the outer housing part (1b) being releasably connected to the inner housing part (1a) so that the outer housing part (1b) essentially surrounds the inner housing part (1a); and
a dirt seal (11b) arranged between the inner housing part (1a) and the outer housing part (1b), the outer housing part (1b) is designed as a union nut, which can be screwed to the inner housing part (1a) wherein the latching shoulder (8) is provided in an entry region (4a) of the receiving opening (4) at one end of the outer housing part (1b); and
a second latching element (6) arranged on the plug (2) so that the second latching element (6) interacts with the latching shoulder (8) to establish a partially inserted prelatching position, and, on further insertion of the plug (2), the other latching element (7) on the plug (2) then interacts with the latching shoulder (8) to establish a completely inserted full latching position, with, in the prelatching position, an incomplete seal being provided so that when a fluid or a gas pressurized, a limited perceptible leakage occurs in a defined manner as an acoustically perceptible leakage noise, and with, in the full latching position, a complete pressure-tight seal is provided by the at least one circumferential seal (5) bearing against a sealing surface of the inner housing part (1a).

22. A plug-in coupling for fluidic systems, comprising:
a housing (1) and a plug (2), the plug (2) having an annular groove, the plug (2) being insertable into the housing (1) by inserting a plug stem (3) of the plug (2) into a receiving opening (4) of the housing (1) so that at least one circumferential seal (5, 5a, 5b) provides a seal therebetween;
a locking device locking the plug (2) in the housing (1) so as to be locked therein against release, the locking device including at least one latching element (6, 7) comprising snap ring held in a respective annular groove of the plug (2) and a latching shoulder (8) arranged on the housing (1) and interacting with the latching element (7);
said housing (1) having a two-part construction to provide an inner housing part (1a) and an outer housing part (1b), the outer housing part (1b) being releasably connected to the inner housing part (1a) so that the outer housing part (1b) essentially surrounds the inner housing part (1a); and
a dirt seal (11b) arranged between the inner housing part (1a) and the outer housing part (1b), the outer housing part (1b) is designed as a union nut, which can be screwed to the inner housing part (1a) wherein the latching shoulder (8) is provided in an entry region (4a) of the receiving opening (4) at one end of the outer housing part (1b); and
a removal sleeve (12) which can be screwed into the outer housing part (1b), the removal sleeve (12) including an entry region (13a) of an axial opening (13), starting from a first inside diameter, which is larger than an outside diameter of the snap ring in an expanded state, and then tapering conically inwardly to a second inside diameter which corresponds approximately to the outside diameter of the snap ring in a compressed state.

23. A plug-in coupling for fluidic systems, comprising:
a housing (1) and a plug (2) having an annular groove, the plug (2) being insertable into a housing (1) by inserting a plug stem (3) of the plug (2) into a receiving opening (4) of the housing (1) so that at least one circumferential seal (5, 5a, 5b) provides a seal therebetween, the plug (2) having a collar (10) expanded in diameter with respect to a remaining body portion of the plug (2) and providing a stop for an outer housing part (1b) of the housing (1);
a locking device locking the plug (2) in the housing (1) against relative displacement thereto, the locking device including at least one latching element (7) in form of a snap ring fixed in an axial position against axial movement in said annular groove of the plug (2) and a latching shoulder (8) arranged on the housing (1) and interacting with the latching element (7);
said housing (1) having a two-part construction to provide an inner housing part (1a) and an outer housing part (1b), the outer housing part (1b) being releasably connected to the inner housing part (1a) so that the outer housing part (1b) essentially surrounds the inner housing part (1a), the outer housing part (1b) is designed as a union nut, which can be screwed to the inner housing part (1a), wherein the latching shoulder (8) is provided in an entry region (4a) of the receiving opening (4) at one end of the other housing part (1b);
wherein the plug stem (3) of the plug (2) includes at least two circumferential seals (5, 5a, 5b), which are engaged in grooves (9a, 9b) around an introductory stud (9) of the plug (2);
whereby, when the plug (2) is inserted in said housing (1), the at least two circumferential seals (5, 5a, 5b) bear their outer edges against an inside surface of the inner housing part (1a).

24. A plug-in coupling for fluidic systems, comprising:
a housing (1) and a plug (2) having an annular grove, the plug (2) being insertable into a housing (1) by inserting a plug stem (3) of the plug (2) into a receiving opening (4) of the housing (1) so that at least one circumferential seal (5, 5a, 5b) provides a seal therebetween, the plug (2) having a collar (10), expanded in diameter with respect to a remaining body portion of the plug (2) and providing a stop for an outer housing part (1b) of the housing (1);
a locking device locking the plug (2) in the housing (1) against relative displacement thereto, the locking device including at least one latching element (7) in form of a snap ring held in said annular groove of the plug (2) and a latching shoulder (8) arranged on the housing (1) and interacting with the latching element (7);

said housing (1) having a two-part construction to provide an inner housing part (1a) and an outer housing part (1b) being releasably connected to the inner housing part (1a) so that the outer housing part (1b) essentially surrounds the inner housing part (1a), the outer housing part (1b) is designed as a union nut, which can be screwed to the inner housing part (1a), wherein the latching shoulder (8) is provided in an entry region (4a) of the receiving opening (4) at one end of the other housing part (1b);

wherein the latching element (7) or latching elements (6, 7) are provided by a snap ring held in an respective annular groove of the plug (2);

and wherein the outer housing part (1b) has a taper in the entry region (4a) of the receiving opening (4), the taper starting from a first inside diameter, which is larger than the outside diameter of the snap ring in an expanded state, and extending conically inwardly to a second inside diameter corresponding approximately to the outside diameter of the snap ring in a compressed state;

so that, when the plug (20 is inserted in said housing (1), the snap ring is compressed in the entry region (4a) of the receiving opening (4) and the springs open after it has passed the entry region (4a) and positions itself behind the latching shoulder (8).

\* \* \* \* \*